United States Patent
Gupta et al.

(10) Patent No.: US 10,680,966 B2
(45) Date of Patent: Jun. 9, 2020

(54) INTELLIGENT BUFFERING FOR PACKET REORDERING BY VIRTUAL NODES WITHIN A NETWORK DEVICE

(71) Applicant: Juniper Networks, Inc., Sunnyvale, CA (US)

(72) Inventors: Sayantani Gupta, Bangalore (IN); Babu Singarayan, San Jose, CA (US); Sharmila Koppula, Cupertino, CA (US); Gaurav Ganeriwal, Santa Clara, CA (US); Arun G Menon, Bangalore (IN); Vishnu Janardhanan S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 133 days.

(21) Appl. No.: 15/855,276

(22) Filed: Dec. 27, 2017

(65) Prior Publication Data
US 2019/0199647 A1 Jun. 27, 2019

(51) Int. Cl.
*H04L 12/863* (2013.01)
*H04L 12/741* (2013.01)
*H04L 12/801* (2013.01)
*H04L 12/823* (2013.01)
*H04L 12/803* (2013.01)
(Continued)

(52) U.S. Cl.
CPC ............ *H04L 47/624* (2013.01); *H04L 45/74* (2013.01); *H04L 47/125* (2013.01); *H04L 47/32* (2013.01); *H04L 47/34* (2013.01); *H04L 49/25* (2013.01); *H04L 12/2854* (2013.01); *H04L 43/106* (2013.01); *H04L 49/70* (2013.01)

(58) Field of Classification Search
CPC ......... H04L 49/25; H04L 49/70; H04L 47/32; H04L 47/125; H04L 47/34; H04L 47/624; H04L 12/2854; H04L 43/106; H04L 45/74
See application file for complete search history.

(56) References Cited

U.S. PATENT DOCUMENTS 8,605,722 B1 12/2013 Sindhu et al.
9,083,655 B2 7/2015 Matthews et al.
(Continued)

FOREIGN PATENT DOCUMENTS

EP 2713567 A1 4/2014
WO 2016014279 A1 1/2016

OTHER PUBLICATIONS

Extended Search Report from counterpart European Application No. 18197426.2, dated Jan. 3, 2019, 9 pp.
(Continued)

*Primary Examiner* — Ricardo H Castaneyra
(74) *Attorney, Agent, or Firm* — Shumaker & Sieffert, P.A.

(57) ABSTRACT

The techniques describe packet reordering for packets flowing on a new path in response to a change in internal forwarding paths in a network device. For example, a network device may dynamically change the selection of an internal forwarding path to achieve fabric path optimization ("OFP") or to ensure optimized load balancing. Packets forwarded on the new path are buffered such that the transmission of packets forwarded on the new path are delayed for a buffering time period of at least the time in which a packet is being sent from the source packet processor to the initial destination packet processor.

21 Claims, 6 Drawing Sheets

(51) Int. Cl.
*H04L 12/947* (2013.01)
*H04L 12/26* (2006.01)
*H04L 12/931* (2013.01)
*H04L 12/28* (2006.01)

(56) References Cited

U.S. PATENT DOCUMENTS

| | | | |
|---|---|---|---|
| 2013/0058335 A1* | 3/2013 | Koponen | H04L 47/00 370/390 |
| 2013/0290955 A1* | 10/2013 | Turner | H04L 41/12 718/1 |
| 2014/0098818 A1 | 4/2014 | Matthews et al. | |
| 2014/0169383 A1* | 6/2014 | Jain | H04L 45/22 370/412 |
| 2016/0021018 A1* | 1/2016 | Hui | H04L 47/624 370/412 |

OTHER PUBLICATIONS

U.S. Appl. No. 15/610,233, by Juniper Networks, Inc. (Inventors: Jeganathan et al.), filed May 31, 2017.

U.S. Appl. No. 15/827,476, by Juniper Networks, Inc. (Inventors: Janardhanan et al.), filed Nov. 30, 2017.

Response to Extended Search Report dated Jan. 3, 2019, from counterpart European Application No. 18197426.2, filed Jan. 2, 2020, 18 pp.

Examination Report dated Mar. 20, 2020, from counterpart European Application No. 18197426.2, 6 pp.

\* cited by examiner

INTELLIGENT BUFFERING FOR PACKET REORDERING BY VIRTUAL NODES WITHIN A NETWORK DEVICE

TECHNICAL FIELD

The disclosure relates to computer networks and, more specifically, to packet routing and switching within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

Routers may include one or more packet processors interconnected by an internal switch fabric. Packet processors receive and send data with other external devices via interface cards. The switch fabric provides an internal interconnect mechanism for forwarding data within the router between the packet processors for ultimate transmission over a network. In some examples, a router or switching device may employ a distributed, multi-stage switch fabric architecture, in which network packets traverse multiple stages of the switch fabric located in distributed packet processors of the router to travel from an ingress point of the switch fabric to an egress point of the switch fabric.

SUMMARY

In general, this disclosure describes techniques for intelligent buffering for packets forwarded on a new path in response to a change in internal forwarding paths in a network device. In some examples, a network device such as a router may be virtualized into multiple virtual network nodes by portioning hardware resources of the router, such as packet processors. One or more logical links may be provisioned between two virtual nodes. For example, an abstract fabric interface (AF) link is a logical link construct and provides connectivity between virtual nodes. A source packet processor may forward incoming data across the internal switch fabric via the AF link towards a destination packet processor for ultimate transmission over a network.

For example, a network device such as a single-chassis router may dynamically change the selection of an internal forwarding path to avoid unnecessary fabric hops on the fabric path or to improve load balancing. As one example, the internal forwarding path may change from an initial path between a source packet processor (e.g., a packet forwarding engine (PFE)) and an initial destination packet processor to a new path between the source packet processor and an egress packet processor. The techniques described herein provide buffering of packets forwarded on the new path such that the transmission of packets forwarded on the new path are delayed for a buffering time period of at least the time in which a packet is being sent from the source packet processor to the initial destination packet processor. The techniques may provide specific technical improvements to the network device, such as resolving packet reordering issues for all types of data and control traffic at the destination packet processor, especially in situations where one or more packets forwarded on the initial path have not completed transmission over the switch fabric before one or more subsequent packet forwarded along the new path are received by the egress packet processor. In this way, the network device can automatically buffer packets at the egress packet processor in the occurrence of any change in network topology or packet flow, and/or inform of any changes in flow and buffering timeout to a path module.

In one example, a method includes receiving, by a destination virtual routing node of a network device having a plurality of packet processors and a switch fabric comprising a plurality of fabric links coupling respective pairs of the plurality of packet processors at respective fabric interfaces of the plurality of packet processors, one or more packets. The method also includes determining, by the destination virtual routing node, whether the one or more packets are forwarded on a first path through the switch fabric or a second path through the switch fabric. The method further includes, in response to determining that the one or more packets are forwarded on the second path, buffering, by the destination virtual routing node, the one or more packets for a buffering time period. The method also includes, in response to the buffering time period having elapsed, transmitting, by the destination virtual routing node, the buffered one or more packets on an egress interface of the destination virtual routing node.

In another example, a network device includes a plurality of packet processors; a plurality of fabric links coupling respective pairs of the plurality of packet processors at respective fabric interfaces of the plurality of fabric components; a virtual routing node of a plurality of virtual routing nodes, wherein the virtual routing node is configured to: receive one or more packets; determine whether the one or more packets are forwarded on a first path through the switch fabric or a second path through the switch fabric; in response to determining that the one or more packets are forwarded on the second path, buffer the one or more packets for a buffering time period; and in response to the buffering time period having elapsed, transmit the buffered one or more packets on an egress interface of the destination virtual routing node.

In another example, a system includes a plurality of packet processors; a plurality of fabric links coupling respective pairs of the plurality of packet processors at respective fabric interfaces of the plurality of fabric components; a path module for computing a buffering time period; a source virtual routing node and a destination virtual routing node of a plurality of virtual routing nodes, wherein the destination virtual routing node is configured to: receive one or more packets; determine, based on the forwarding information, whether the one or more packets are forwarded on the first path through the switch fabric or the second path through the switch fabric; in response to determining that the one or more packets are forwarded on the second path, buffer the one or more packets for a buffering time period; and in response to the buffering time period having elapsed, transmit the buffered one or more packets on an egress interface of the destination virtual routing node.

The details of one or more examples of the techniques described herein are set forth in the accompanying drawings and the description below. Other features, objects, and advantages of the techniques described herein will be apparent from the description and drawings, and from the claims.

DETAILED DESCRIPTION

Figure 1:
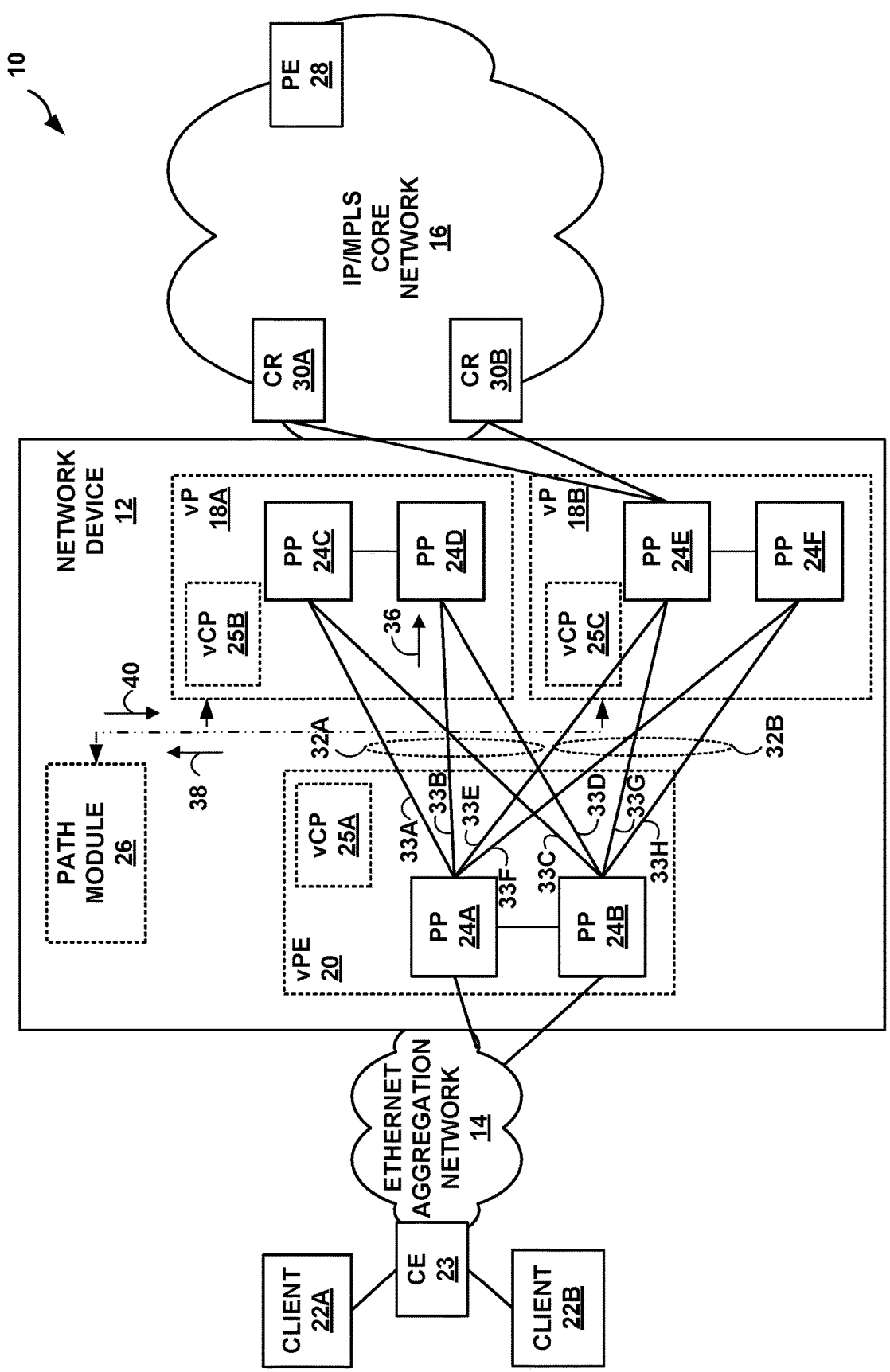
FIG. 1 is a block diagram illustrating an example network environment that includes a logical view of a network device configured in accordance with techniques described in this disclosure.

FIG. 1 is a block diagram illustrating an example network environment 10 that includes a logical view of a network device 12 configured in accordance with techniques described in this disclosure. For purposes of example, the techniques of this disclosure are described with respect to a simplified network environment 10 of FIG. 1 in which network device 12 communicates with core routers (CR) 30A-30B ("core routers 30") to provide client devices 22A-22B ("client devices 22") with access to services provided by devices in Internet Protocol (IP)/Multi-Protocol Label Switching (MPLS) core network 16.

The configuration of network environment 10 illustrated in FIG. 1 is merely an example. Although not illustrated as such, IP/MPLS core network 16 may be coupled to one or more networks administered by other providers, and may thus form part of a large-scale public network infrastructure, e.g., the Internet. Ethernet aggregation network 14 may be viewed as an access network to the Internet. A service provider network may provide computing devices coupled to client devices 22 with access to the Internet, and may allow the computing devices within customer networks (not shown) to communicate with each other. In another example, IP/MPLS core network 16 may provide network services within the core of the Internet. In either case, IP/MPLS core network 16 may include a variety of network devices (not shown) other than network device 12, provider edge (PE) router 28, and core routers 30, such as additional routers, switches, servers, or other devices.

Client devices 22 may be devices associated with one or more customer networks (not shown) coupled to customer edge (CE) router 23. In some examples, client devices 22 may include computing devices, such as personal computers, laptop computers, handheld computers, workstations, servers, switches, printers, customer data centers or other devices, for example. In other examples, client devices 22 may be endpoint devices such as a switch, a router, a gateway, or another terminal that operates as a demarcation point between customer equipment, such as subscriber devices, and service provider equipment. In one example, client devices 22 may comprise a digital subscriber line access multiplexer (DSLAM) or other switching device. For example, client devices 22 may be connected to one or more wireless radios or base stations (not shown) to wirelessly exchange packetized data with subscriber devices. Client devices 22 may comprise a switch, a router, a gateway, or another terminal that aggregates the packetized data received from the wireless radios to CE router 23. In some examples, aggregation network 14 may include an optical access network. For example, CE router 23 may comprise an optical line terminal (OLT) connected to one or more client devices 22 or optical network units (ONUs) via optical fiber cables.

Client devices 22 may be access nodes coupled to customer networks and subscriber devices. Client devices 22 are clients of services provided by PE router 28. In this example, a service provider network includes client devices 22 and customer edge (CE) router 23 that provide subscriber devices with access to aggregation network 14. In some examples, CE router 23 may comprise a router that maintains routing information between subscriber devices and aggregation network 14. CE router 23, for example, may include Broadband Remote Access Server (BRAS) functionality to aggregate output from one or more client devices 22 into a higher-speed uplink to aggregation network 14.

Network device 12 includes multiple routing components (e.g., routing processes) and packet processors (e.g., PFEs) that are physically coupled and configured to operate as separate logical routers. Network device 12 includes a virtual provider edge (vPE) node 20 ("vPE 20") and virtual core router (vP) nodes 18A-18B ("vPs 18"), which are cooperative virtual routing components operating as multiple distinct nodes from the perspective of network devices external to network device 12. Network device 12 may include a single-chassis router having a single physical chassis, which is virtualized into multiple virtual network nodes (referred to as "vNodes") by portioning hardware resources of the router, such as packet processors 24A-24F ("PP 24"), e.g., packet forwarding engines (PFEs). In the example of FIG. 1, each of vNodes 18, 20 includes one or more PPs 24. Individual PPs 24 are associated with a particular vNode and are not shared among multiple vNodes. In the example of FIG. 1, vPE 20 may include PPs 24A and 24B; vP 18A may include PPs 24C and 24D; and vP 18B may include PPs 24E and 24F.

To core routers 30 and CE router 23 of network environment 10, network device 12 appears as multiple routing devices, specifically, virtual PE (vPE) router 20 (herein referred to as a "source virtual routing node"), and virtual provider (vP) routers 18 (herein referred to as "destination virtual routing node(s)"). For example, although network device 12 includes a single chassis, from the perspective of core routers 30, network device 12 has multiple externally-advertised network addresses and maintains multiple peer routing sessions for each routing protocol maintaining peer routing sessions with each of the core routers 30.

Each of the vNode's control plane (vCP) 25A-25C ("vCPs 25") instantiates with virtual machine (VM) technology. The vCP 25 either could be within the control unit (e.g., routing component) of network device 12 or outside the routing component. Each vNode could serve the role of different network functions, such as Internet service provider edge (PE), Virtual Private Network (VPN) service PE and Multiprotocol Label Switching (MPLS) Label Switching Router (LSR). Apart from these vNodes, in some examples network device 12 may also include an administrative VM instantiated for shared resources management (e.g., a management plane, not shown in FIG. 1).

Between two vNodes in network device 12, one logical layer-3 link is provisioned that is visible to devices external to network device 12. For example, in FIG. 1, abstract fabric interface (AF) links 32A-32B ("AF links 32") provide a logical link between vPE 20 and vP 18A, and vPE 20 and vP 18B, respectively. Each of AF links 32 are layer-3 logical link constructs and provide vNode to vNode connectivity. AF links 32 bundle those fabric interconnects that connect the same vNodes. AF provide a single logical link connectivity between the vNodes, and could have many layer-1, layer-2, or layer-3 fabric bundling within, depending on implementation.

AF 32A includes fabric interconnects 33A-33D, and AF 32B includes fabric interconnects 33E-33H (collectively, "fabric interconnects 33"). Fabric interconnects terminate at fabric interfaces of one of PPs 24. The fabric interfaces may, in some examples, have identifiers, which are not generally advertised to devices external to network device 12. The fabric interconnects 33 are modelled as point-to-point Ethernet links between a pair of PPs 24. AF emulates as point-to-multipoint and fabric interfaces (FIs) emulate as point-to-point interfaces.

In one example, assume vPE 20 provides MPLS-based VPN services, and CE 23 connects to PP 24A. Assume also that vPE 20 connects to vP 18A with fabric equal cost logical paths via PP 24C and PP 24D, and vPE 20 connects to vP 18B with fabric equal cost logical paths via PP 24E and PP 24F. When a packet comes to vPE 20 from Ethernet aggregation network 14 and destined for PE 28, vPE 20 typically sends data traffic to any of PPs 24C-24F based on ECMP load balancing. For example, AF link 32A may include fabric interfaces 33A-33D to interconnect packet processors of vPE 20 to packet processors of vP 18A, and fabric interfaces 33E-33H to interconnect packet processors of vPE 20 to packet processors of vP 18B. vPE 20 may perform a hashing algorithm to determine which one of fabric interconnects 33 that is used for an outgoing interface.

Assume that PE 28 is reachable from vP 18B only via PP 24E. vPE 20 may typically load balance traffic by performing a hash algorithm to select a fabric interface (e.g., fabric interface 33B) for forwarding traffic towards PE 28. In the example of FIG. 1, vPE 20 may perform the hashing algorithm to select fabric interconnect 33B for which source PP 24A forwards a packet on an initial path (otherwise referred to as "first path") to an initial destination PFE, e.g., PFE 24D. As a non-egress PFE, PFE 24D receives the packet, determines the egress FC, and forwards the packet to the egress FC for ultimate transmission to IP/MPLS core network 16. This results in an additional fabric hop.

To optimize the internal forwarding path within network device 12, the forwarding path on the ingress vNode may, in some examples, be changed to forward packets on a new path (otherwise referred to as "second path") through the switch fabric directly to a new destination packet processor, e.g., PP 24E. In this manner, the internal forwarding path through the switch fabric of network device 12 is modified to avoid an unnecessary fabric hop. In one example, a downstream vNode (e.g., vPE 18B) may signal to the adjacent upstream vNode (e.g., vP 20) information associated with an optimal fabric path next hop such that the next hop is configured to egress PP 24E. In another example, downstream vNodes (e.g., vPE 18B) may send fabric path information associated with an egress packet processor to path module 26 such that upstream vNodes (e.g., vP 20) may receive the fabric path information associated with the egress packet processor and directly forward packets to the egress packet processor instead of load balancing packets. In other examples, the ingress vNode may perform adaptive load balancing. Further examples of optimal fabric paths are provided in U.S. patent application Ser. No. 15/610,233, filed May 31, 2017, and U.S. patent application Ser. No. 15/827,476, filed Nov. 30, 2017, the entire contents of each of which are incorporated by reference herein in their respective entireties.

However, an egress packet processor may in some instances transmit packets in a packet flow on the new path to IP/MPLS core network 16 before one or more in-flight packets in the same packet flow on the initial path are transmitted to IP/MPLS core network 16. For example, source PP 24A may forward an initial packet in a packet flow on an initial path towards PP 24D. Following a change in internal forwarding paths and as the initial packet is still in-flight, source PP 24A may forward a subsequent packet in the packet flow on a new path directly towards egress PP 24E. Because it may take longer for the initial packet to travel along the initial path than for the subsequent packet to travel on the new path, e.g., due to an additional fabric hop on the initial path, egress PP 24E may receive the subsequent packet before receiving the initial packet. Before egress PP 24E receives the initial packet from PP 24D, source PP 24A may transmit the subsequent packet on the new path to IP/MPLS core network 16. Egress PP 24E may then receive the initial packet from PP 24D, which causes packet reordering at egress PP 24E.

In accordance with the techniques described herein, an egress packet processor of a destination virtual node may be configured to buffer packets flowing on the new path for at least the time in which a packet flows from a source packet processor to an initial destination packet processor (herein referred to as "actual packet reach time"). In the example FIG. 1, egress PP 24E may buffer one or more packets determined to be flowing on a new path for a buffering time period of at least a time in which a packet flows from source PP 24A to initial destination PP 24D. Egress PP 24E may determine, e.g., based on one or more hash values received from PPs 24, whether the internal forwarding path of the one or more packets was optimized. Egress PP 24E may also determine the buffering time period for which egress PP 24E should buffer the one or more packets before transmitting the packets on an outgoing interface based on one or more timestamps received from PPs 24.

For example, source PP 24A may send to destination PP 24D a sampling packet 36 including a first hash value associated with an initial path to destination PP 24D. The first hash value is used to select a path for which source PP 24A forwards the packet towards the fabric. In the example of FIG. 1, vPE 20 may perform a hashing algorithm to select a path to destination PP 24D (e.g., the initial path). The first hash value in some instances is calculated based on a 5-tuple packet (e.g., source IP address, destination IP address, source port, destination port, and protocol), and is used to select a path for which source PP 24A forwards the packet towards the fabric. In the example of FIG. 1, vPE 20 may perform a hashing algorithm to select a path to destination PP 24D (e.g., the initial packet path). In some examples, the first hash value identifies the initial, non-optimized path to PP 24D and is used by path module 26 to trigger a change in internal forwarding paths.

Sampling packet 36 may also include a first timestamp associated with the starting time of a packet flowing from source PP 24A to destination PP 24D. For example, the first timestamp of sampling packet 36 provides the starting time in which sampling packet 36 travels to PP 24D. Source PP 24A may send sampling packet 36 including the first hash value and the first timestamp on the initial path to PP 24D. Although illustrated as a single sampling packet to PP 24D, the techniques may provide for sending any number of sampling packets to PP 24D. For example, respective sampling packets may include only the hash value or only the timestamp.

PP 24D receives sampling packet 36 and may add to the sampling packet a second hash value associated with the new path to egress FC 24E, which is used to select an egress packet processor (e.g., PP 24E) for ultimate transmission of the packet to IP/MPLS core network 16. For example, vP 18A may in some instances calculate the second hash value for the flow based on the 5-tuple parameters, and is used to select an egress packet processor (e.g., PP 24E) for ultimate transmission of the packet to IP/MPLS core network 16. As further described below, the second hash value uniquely identifies the packet flow that is to be reordered.

PP 24D may also add to the sampling packet a second timestamp representing the ending time of the packet flowing from source PP 24A to initial destination PP 24D. For example, upon receiving sampling packet 36, PP 24D adds a second timestamp to the sampling packet, which provides the ending time in which sampling packet 36 travels from source PP 24A to PP 24D.

In some examples, PP 24D may send sampling packet 38 including the hash values and the timestamps to path module 26. In other examples, PP 24D may send sampling packet 38 directly to egress PP 24E. In any event, actual packet reach time for a packet flowing from a source packet processor to a destination packet processor may be computed based on the first and second timestamps. For example, path module 26 may compute the difference between the first timestamp and the second timestamp (i.e., subtract the first timestamp from the second timestamp). The difference in timestamps may represent the actual packet reach time for a packet traveling on an initial path (e.g., from source PP 24A to destination PP 24D). Based on the actual packet reach time, path module 26 may compute a buffering time period to control how long egress PP 24E buffers packets received from the new path before transmitting the buffered packets. Path module 26 may send the buffering time period and the second hash value to egress PP 24E. In some examples, path module 26 may optimize the timeout across flows for the same egress forwarding component, resulting in better scaling. In some examples, path module 26 may include a telemetry server that receives statistics and performs additional functions such as monitoring traffic flows and aging out traffic flows. Although path module 26 is illustrated as within the network device 12, path module 26 may be external to the network device 12.

Egress PP 24E may receive the second hash value and buffering time period. In some examples, egress PP 24E may store the second hash value received from path module 26 in its forwarding information when a change in forwarding path is determined and before path module 26 propagates the change to source PP 24A. Following a fabric path change, egress FC 24E may receive a packet from either the switch fabric or directly over the abstract fabric interface and determine whether the packet was forwarded on the initial path or new path. For a packet received directly from its abstract fabric interface, egress PP 24E may in some examples perform a lookup in its stored forwarding information to determine if a hash value for the received packet matches the stored hash value (e.g., second hash value).

If the lookup succeeds, egress PP 24E may determine that the packet was forwarded on the new path (i.e., received directly from source PP 24A). Responsive to determining that the packet was forwarded on the new path, egress PP 24E buffers the received packet and starts the timer of the buffering time period received from the path module 26. When the buffering time period is elapsed, egress PP 24E may release and transmit the buffered packets to IP/MPLS core network 16.

Alternatively, or additionally, if the lookup fails, i.e., there is no matching entry in the forwarding information lookup table for the hash value, or the packet is received from the switch fabric but not directly over an AF interface, egress PP 24E may determine that the received packet was forwarded on the initial path (e.g., received by a fabric hop from PP 24D). Alternatively, egress PP 24E may determine a packet was received from an initial packet path by determining that the packet has been received from the switch fabric but not directly over an abstract fabric interface.

Egress PP 24E may transmit the packet determined as forwarded on the initial path to IP/MPLS core network 16. That is, egress PP 24E forwards packets received from the initial path to IP/MPLS core network 16, whereas egress PP 24E buffers packets received from the new path until a buffering time period ends.

In some examples, egress PP 24E may, upon the completion of the buffering time period, transmit the plurality of packets in the buffer to IP/MPLS core network 16 in the order that the plurality of packets was buffered. In other examples, when the buffering time period is elapsed, egress PP 24E may release the buffered packets and transmit the packets to IP/MPLS core network 16 in an order of the sequence number of the packets.

In this way, egress PP 24E may delay the transmission of packets received on a new path for a time in which packets flowing on the initial path are transmitted to IP/MPLS core network 16. This ensures that, if there are any packets in flight over the optimized path for a particular flow, these packets are transmitted to the IP/MPLS core network after the buffer is emptied for that particular flow, thereby resolving the issue of packet reordering at the destination packet processor. That is, all packets received for the flow after a timeout are reordered behind the buffered packets.

Figure 2:
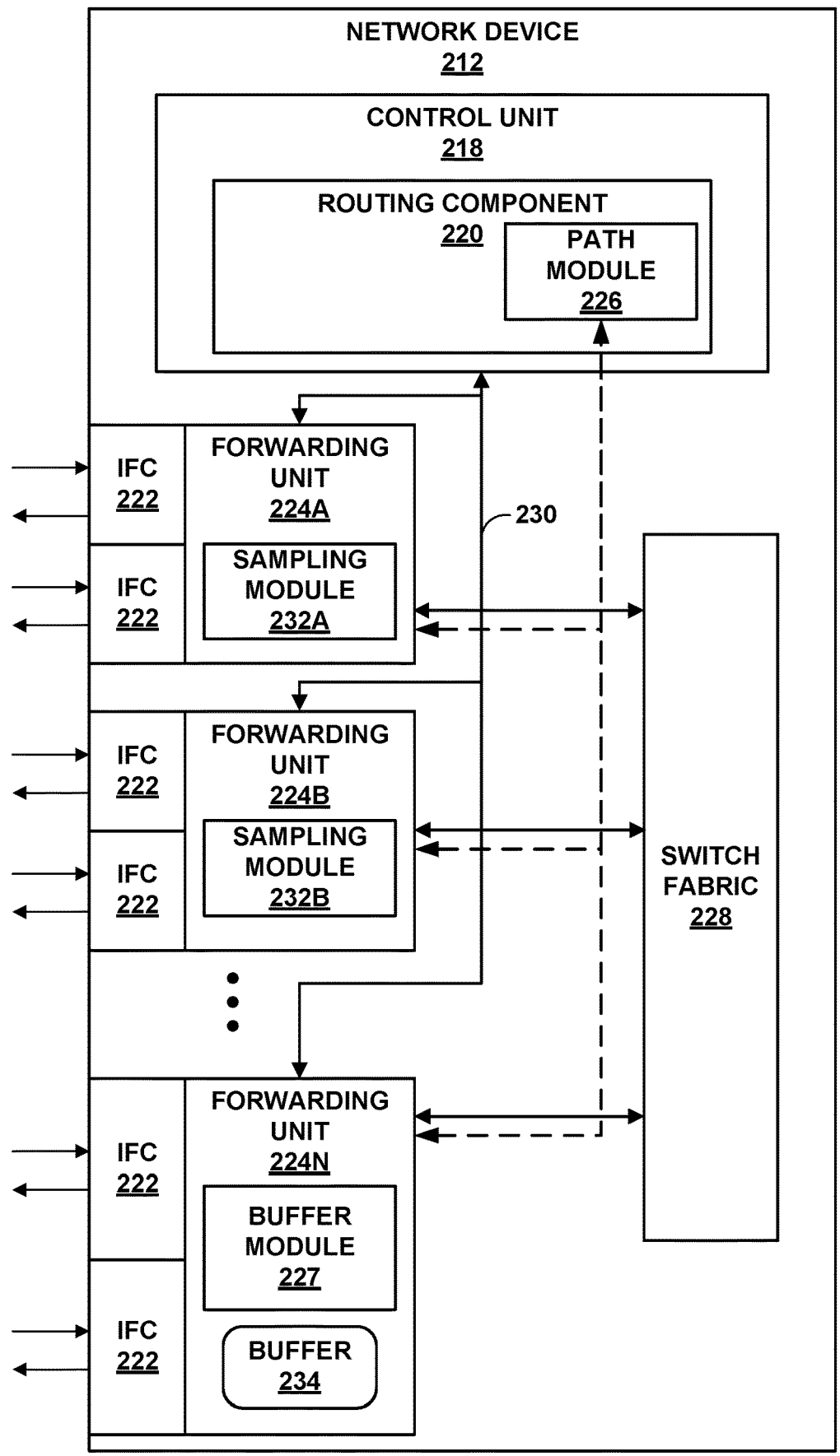
FIG. 2 is a block diagram illustrating an example network device, in accordance with the techniques of this disclosure.

FIG. 2 is a block diagram illustrating an example network device 212 that provides buffering of packets until a variable period of time in which packets forwarded on the initial path in the pipeline are cleared, in accordance with the techniques of this disclosure. Network device 212 may represent network device 12 of FIG. 1, for example. Network device 212 may include multiple virtual nodes operating as, for example, virtual provider edge or virtual customer edge routers, virtual autonomous system border routers (ASBRs), virtual area border routers (ABRs), or another type of network device, such as a virtual switch.

In this example, network device 212 includes a control unit 218 that provides control plane functionality for network device 212. Control unit 218 may be distributed among multiple entities, such as one or more routing units and one or more service cards insertable into network device 212. In such instances, network device 212 may therefore have multiple control planes. In some examples, each virtual routing node of network device 212 may have its own virtual control plane, e.g., vCPs 25 of FIG. 1.

Control unit 218 may include a routing component 220 that provides control plane functions, storing network topology in the form of routing tables, executing routing protocols to communicate with peer routing devices, and maintaining and updating the routing tables. Routing component 220 also provides an interface to allow user access and configuration of network device 212.

Network device 212 also includes a plurality of forwarding units in the form of example forwarding units 224A-224N ("forwarding units 224") and a switch fabric 228, that together provide a forwarding plane for forwarding and otherwise processing subscriber traffic. Forwarding units 224 may be, for example, any of vPE 20 and vP 18A, 18B of FIG. 1.

Control unit 218 is connected to each of forwarding units 224 by internal communication link 230. Internal communication link 230 may comprise a 100 Mbps or 1 Gbps Ethernet connection, for instance. Routing component 220 may execute daemons (not shown), e.g., user-level processes that may run network management software, to execute routing protocols to communicate with peer routing devices, execute configuration commands received from an administrator, maintain and update one or more routing tables, manage subscriber flow processing, and/or create one or more forwarding tables for installation to forwarding units 224, among other functions.

Control unit 218 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 218 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Forwarding units 224 receive and send data packets via interfaces of interface cards 222A-222N ("IFCs 222") each associated with a respective one of forwarding units 224. Each of forwarding units 224 and its associated ones of IFCs 222 may reside on a separate line card (not shown) for network device 212. Example line cards include flexible programmable integrated circuit (PIC) concentrators (FPCs), dense port concentrators (DPCs), and modular port concentrators (MPCs). Each of IFCs 222 may include interfaces for various combinations of layer two (L2) technologies, including Ethernet, Gigabit Ethernet (GigE), and Synchronous Optical Networking (SONET) interfaces. In various aspects, each of forwarding units 224 may comprise more or fewer IFCs. Switch fabric 228 provides a high-speed interconnect for forwarding incoming data packets to the selected one of forwarding units 224 for output over a network. Switch fabric 228 may include multiple fabric links (not shown), such as fabric links 33 of FIG. 1.

In some examples, switch fabric 228 may be a distributed, multi-stage switch fabric architecture, in which network packets traverse multiple stages of the switch fabric located in distributed forwarding components of the router to travel from an ingress point of the switch fabric to an egress point of the switch fabric. As one example, switch fabric 228 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches-often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

Forwarding units 224 process packets by performing a series of operations on each packet over respective internal packet processing paths as the packets traverse the internal architecture of network device 212. Operations may be performed, for example, on each packet by any of a corresponding ingress interface, an ingress forwarding unit 224, an egress forwarding unit 224, an egress interface or other components of network device 212 to which the packet is directed prior, such as one or more service cards. The result of packet processing determines the way a packet is forwarded or otherwise processed by forwarding units 224 from its input interface on one of IFCs 222 to its output interface on one of IFCs 222.

To illustrate by way of an example, assume forwarding units 224A, 224B, and 224N may include packet processors (not shown) associated with PPs 24A, 24D, and 24E of FIG. 1, respectively. In this example, destination forwarding unit 224N is the new destination forwarding unit of a new path and destination forwarding unit 224B is the initial destination forwarding unit of an initial path. Assume also that forwarding unit 224N is the egress forwarding unit to transmit data to the IP/MPLS core network. Forwarding unit 224A may initially forward the incoming traffic on an initial path to forwarding unit 224B, which in turn forwards the packet on a next fabric hop to egress forwarding unit 224N. To improve (e.g., optimize) the forwarding path, control unit 218 may trigger a change in packet path such that forwarding unit 224A directly forwards incoming packets to destination forwarding unit 224N. In the example of FIG. 2, routing component 220 may include a path module 226 for receiving hash values and timestamps, and for sending to destination forwarding unit 224N a buffering time period for which destination forwarding unit 224N buffers packets forwarded on the new path.

For example, forwarding units 224 may each include sampling modules for configuring a sampling packet including a hash value and a timestamp value. In the example FIG. 2, forwarding unit 224A includes sampling module 232A and forwarding unit 224B includes sampling module 232B. For example, prior to a change in the fabric path, source forwarding unit 224A may in some instances perform a hashing algorithm to select a destination forwarding unit, e.g., forwarding unit 224B. Sampling module 232A may generate a sampling packet including a first hash value associated with forwarding unit 224B on the initial path. Sampling module 232A may additionally, or alternatively, generate a sampling packet including a first timestamp value indicating a time at which the sampling packet was generated by source forwarding unit 224A. Source forwarding unit 224A may send the sampling packet to forwarding unit 224B via switch fabric 228.

Forwarding unit 224B receives the sampling packet and sampling module 232B may add a second hash value and a second timestamp value to the sampling packet. For example, forwarding unit 224B may perform a hashing algorithm to select an egress forwarding unit, e.g., forwarding unit 224E. Sampling module 232B may add to the sampling packet a second hash value associated with forwarding unit 224E, which identifies the packet flow that needs to be reordered. Sampling module 232B may additionally, or alternatively, add to the sampling packet a second timestamp value indicating a time at which the sampling packet was received by destination forwarding unit 224B. Forwarding unit 224B may send the sampling packet with the hash values and timestamp values to path module 226.

Path module 226 may determine an actual packet reach time based on the travel time information. This may represent the duration in which a packet is buffered. For example, to determine the actual packet reach time for a packet flowing internally from source forwarding unit 224A to egress forwarding unit 224N, path module 226 may subtract the first timestamp value from the second timestamp value. In some examples, path module 226 may add a tolerance value to the actual packet time to compute a timeout value, which provides the buffering time period in which a packet that is forwarded on the new path is buffered.

Path module 226 may send the second hash value to forwarding unit 224N, which in this instance identifies forwarding unit 224N as the egress forwarding unit. Path module 226 may also send the buffering time period to egress forwarding unit 224N to control the buffering time.

Figure 3:
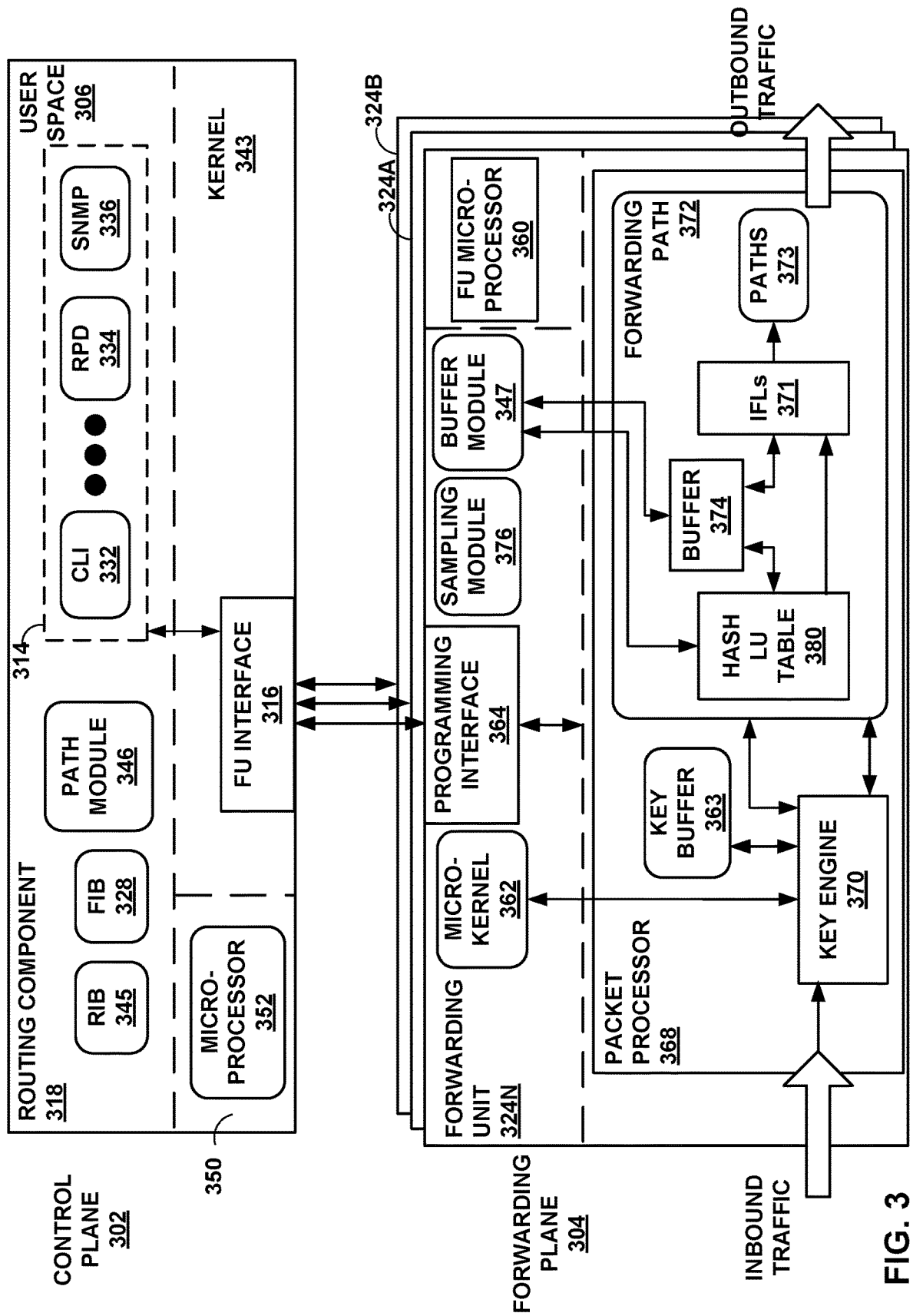
FIG. 3 is a block diagram illustrating example instances of the control unit and forwarding units of FIG. 2 in further detail.

Before a change in forwarding path is propagated to forwarding unit 224A, destination forwarding unit 224N may store the second hash value in a hash lookup table (e.g., Hash LU Table 380 of FIG. 3). In the example of FIG. 2, forwarding unit 224N includes a buffer module 227 that controls the buffering time period for buffering an incoming packet forwarded on the new path in buffer 234.

As one example, source forwarding unit 224A may send one or more initial packets on an initial path to initial destination forwarding unit 224B. While the packets are in the pipeline, control unit 218 may trigger a new path such that forwarding unit 224A directly forwards incoming packets to destination forwarding unit 224N.

Before the packets are transmitted to the IP/MPLS core network, source forwarding unit 224A may send one or more subsequent packets on the new path directly to destination forwarding unit 224N. Forwarding unit 224N may receive the subsequent packets on its abstract fabric interface (via switch fabric 228) directly from source forwarding unit 224A. Forwarding unit 224N may perform a lookup of hash information and determine, based on a lookup of the second hash value in the forwarding information, that the subsequent packets are forwarded on the new path. Buffer module 227 may instruct forwarding unit 224N to store the subsequent packets in buffer 234 and start a timer for a buffering time period defined by buffering module 227. In some examples, buffer module 227 may instruct forwarding unit 224N to buffer the packets based on a first-in-first-out ("FIFO") methodology.

As the subsequent packets are buffered, forwarding unit 224N may receive the initial packet from forwarding unit 224B over switch fabric 228. Forwarding unit 224N may perform a lookup of its hash lookup table and determine, based on a failed lookup of the second hash value in the hash lookup table, or based on detection that the packet received from the switch fabric is not directly over the abstract fabric interface, that the initial packet is forwarded on the initial path. For example, forwarding unit 224N may receive the initial packet from the switch fabric and not directly over the abstract fabric interface. In this example, since forwarding unit 224B already processed the packet through its ingress interface, forwarding unit 224N, upon receiving the initial packet, does not perform a hash table lookup and transmits the packet to the IP/MPLS core network. In another example, forwarding unit 224N may in some instances receive a packet directly over the abstract fabric interface, perform a lookup of its hash lookup table, and determine that the lookup has failed. Forwarding unit 224N may then proceed to transmit the initial packet to the IP/MPLS core network via one of IFCs 222.

In response to the buffering time period having elapsed, buffer module 227 may release the subsequent packets in buffer 234 such that forwarding unit 224N may transmit the subsequent packets. For example, in response to determining that the timer has expired, buffer module 227 of forwarding unit 224N may trigger the release of buffer 234 and disable any further buffering. Forwarding unit 224N may then transmit the subsequent packets to the IP/MPLS core network via one of IFCs 222.

In some examples, buffer 234 may store the subsequent packets forwarded on the new path in sequence such that when a timer expires, buffer module 227 may instruct forwarding unit 224N to release the packets in buffer 234 based on sequence number order of the buffered packets. For example, buffer module 227 may assign a respective sequence number to each buffered packet. When the timer expires, forwarding unit 224N releases the buffer in order of the sequence numbers of the packets. In this way, packets are transmitted in the order that the packets were buffered.

FIG. 3 is a block diagram illustrating example instances of routing component 318 and forwarding units 324 ("forwarding units 324") of forwarding units 224 of FIG. 2 in further detail. Any of forwarding units 324 may be an ingress forwarding unit with respect to one packet flow and an egress forwarding unit with respect to another packet flow. Although forwarding units 324 are illustrated as including the modules for both an ingress forwarding unit and an egress forwarding unit, forwarding units 324 may include more or less modules shown in FIG. 3.

In this example, routing component 318 provides a control plane 302 operating environment for execution of various user-level daemons 314 executing in user space 306. Daemons 314 are user-level processes that may run network management software, execute routing protocols to communicate with peer routing devices, execute configuration commands received from an administrator, maintain and update one or more routing tables, manage subscriber flow processing, and/or create one or more forwarding tables for installation to forwarding units 324, among other functions. In this example, daemons 314 include command-line interface daemon 332 ("CLI 332"), routing protocol daemon 334 ("RPD 334"), and Simple Network Management Protocol daemon 336 ("SNMP 336"). In this respect, control plane 302 may provide routing plane, service plane, and management plane functionality for network device router 212. Various instances of routing component 318 may include additional daemons 314 not shown in FIG. 3 that perform other control, management, or service plane functionality and/or drive and otherwise manage forwarding plane functionality for network device 212.

Daemons 314 operate over and interact with kernel 343, which provides a run-time operating environment for user-level processes. Kernel 343 may comprise, for example, a UNIX operating system derivative such as Linux or Berkeley Software Distribution (BSD). Kernel 343 offers libraries and drivers by which daemons 314 may interact with the underlying system. Forwarding unit interface 316 ("FU interface 316") of kernel 343 comprises a kernel-level library by which daemons 314 and other user-level processes or user-level libraries may interact with programming interface 364 of forwarding unit 324A. FU interface 316 may include, for example, a sockets library for communicating with forwarding unit 324A over dedicated network links.

Hardware environment 350 of routing component 318 comprises microprocessor 352 that executes program instructions loaded into a main memory (not shown in FIG. 3) from storage (also not shown in FIG. 3) in order to execute the software stack, including both kernel 343 and user space 306, of routing component 318. Microprocessor 352 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 334 executes one or more interior and/or exterior routing protocols to exchange routing information with other network devices and store received routing information in routing information base 345 ("RIB 345"). For example, RPD 334 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RPD 334 may additionally, or alternatively, execute User Datagram Protocol (UDP) to send and receive data for various system resources, such as physical interfaces. For example, RPD 334 may use UDP to send and receive data from path module 346. Although illustrated with UDP, RPD 334 may execute any protocol to exchange data for system resources with path module 346.

RIB 345 may include information defining a topology of a network, including one or more routing tables and/or link-state databases. RPD 334 resolves the topology defined by routing information in RIB 345 to select or determine one or more active routes through the network and then installs these routes to forwarding information base 328. Typically, RPD 334 generates FIB 328 in the form of a radix or other lookup tree to map packet information (e.g., header information having destination information and/or a label stack) to next hops and ultimately to interface ports of interface cards associated with respective forwarding units 324. Kernel 343 may synchronize FIB 328 of routing component 318 with forwarding information of forwarding unit 324A.

Command line interface daemon 332 ("CLI 332") provides a shell by which an administrator or other management entity may modify the configuration of network device 212 using text-based commands. SNMP 336 comprises an SNMP agent that receives SNMP commands from a management entity to set and retrieve configuration and management information for network device 212. Using CLI 332 and SNMP 336, for example, management entities may enable/disable and configure services, manage classifications and class of service for packet flows, install routes, enable/disable and configure rate limiters, configure traffic bearers for mobile networks, and configure interfaces, for example. RPD 334, CLI 332, and SNMP 336 in this example configure forwarding plane 304 via FU interface 316 to implement configured services, and/or add/modify/delete routes. FU interface 316 allows daemons 314 to drive the installation and configuration of packet processing path 372 of forwarding unit 324A. In particular, FU interface 316 includes an application programming interface (API) by which daemons 314 may map packet flows to fabric interfaces for forwarding.

Forwarding unit 324A, in combination with other forwarding units 324 of network device 212, implements forwarding plane 304 (also known as a "data plane") functionality to handle packet processing from ingress interfaces on which packets are received to egress interfaces to which packets are sent. Forwarding plane 304 determines data packet forwarding through network device 212, applies services, rate limits packet flows, filters packets, and otherwise processes the packets using service objects and lookup data installed by control plane 302 to forwarding plane 304. Although FIG. 3 illustrates only forwarding unit 324N in detail, each of forwarding units 324 of network device 212 comprises similar modules that perform substantially similar functionality.

Forwarding units 324 may include one or more packet processors 368. Packet processor 368 may include, e.g., Application-specific integrated circuit based packet processors ("ASICs") or any packet forwarding engine that execute forwarding path 372 in accordance with techniques described herein. Packet processor 368 includes one or more programmable application-specific integrated circuits having a key engine 370 that executes microcode (or "micro-instructions") to control and apply fixed hardware components of packet processor 368 to process packet "keys." A packet key includes packet fields and other parameters that determine a flow of packet processing for the packet along a processing path, such as paths 373. Key engine 370 includes key buffer 363 to store packet field data for corresponding packets that the key engine is currently processing. Key buffer 363 may also provide limited writable memory to which elements of the processing path may write to pass messages accessible by future elements. Some instances of packet processors 368 may include a plurality of key engines each having an associated key buffer.

Forwarding path 372 of packet processor 368 comprises programmable, executable microcode and fixed hardware components that determine the packet processing actions and other operations performed by key engine 370. Forwarding unit 324A may store executable instructions of forwarding path 372 in computer-readable storage media, such as static random access memory (SRAM). While illustrated within packet processor 368, in some examples executable instructions of forwarding path 372 may be stored in memory external to packet processor 368 in forwarding unit 324A.

In some aspects, forwarding path 372 includes a next hop data structure to initiate processing. At the end of each processing step by key engine 370, the result is a next hop that may specify additional processing or the termination of processing, for instance. In addition, next hops may specify one or more functions to be executed by key engine 370 and/or one or more hardware elements to be applied (e.g., policers).

Logical interfaces 371 ("IFLs 371") is a table or other data structure that includes one or more logical interfaces. Each of IFLs 371 is an interface to a forwarding path of paths 373. Paths 373 represents one or more forwarding paths for execution by key engine 370 on key buffer 363.

Forwarding unit microprocessor 360 ("FU microprocessor 360") manages packet processor 368 and executes programming interface 364 to provide an interface for/to routing component 318. Programming interface 364 may comprise one or more user- or kernel-level libraries, programs, toolkits, application programming interfaces (APIs) and may communicate control and data messages to forwarding units 324 via internal communication link (e.g., communication link 230 in FIG. 2) using sockets, for example. FU microprocessor 360 may execute a microkernel 362 to provide an operating environment for interfaces. Programming interface 364 receives messages from routing component 318 directing packet forwarding component 324A to configure logical interfaces 371.

In some examples, routing component 318 may determine a location of a next hop that provides a fabric interface next hop that avoids unnecessary fabric hops, referred to as an optimal fabric path (OFP) interface. For performing OFP techniques, the routing component 318 dynamically computes the next hops, and provides the next hops to RPD 334 for advertising, e.g., by sending a BGP message having an OFP attribute. The next hops are advertised and the receiving vNode rewrites the next hops in the RIB 345 to enable OFP.

In some examples, path module 346 may receive fabric path information from an initial destination forwarding unit (e.g., forwarding unit 324B). Path module 346 may send the fabric path information to source forwarding unit 324A such that source forwarding unit 324A may store the fabric path information in forwarding information (not shown in FIG. 3). Source forwarding unit 324A may also mark an outgoing interface of IFLs 371 towards egress forwarding unit 324N. In this way, when source forwarding unit 324A performs a lookup of the next incoming packet, source forwarding unit 324A may determine the fabric path to egress forwarding unit 324N is known for which forwarding unit 324A may output the packet via the marked interface of IFLs 371 towards a next hop to egress forwarding unit 324N.

In operation, a source forwarding unit (e.g., source forwarding unit 324A) may send an initial packet through the fabric to a destination forwarding unit (e.g., destination forwarding unit 324N) for ultimate transmission to a network. For example, source forwarding unit 324A may send the initial packet on an initial path to an initial destination forwarding unit (e.g., forwarding unit 324B), which in turn forwards the packet on the next fabric hop to egress forwarding unit 324N. While the initial packet is in the pipeline (i.e., not transmitted to the network), the fabric path is changed to a new path to egress forwarding unit 324N such that source forwarding unit 324A forwards a subsequent packet directly to egress forwarding unit 324N on the new path.

In the example of FIG. 3, forwarding units 324 may each include a sampling module 376 used by an ingress forwarding unit or an egress forwarding unit in a packet flow for configuring a sampling packet including a hash value and/or a timestamp value. As one example, sampling module 376 of source forwarding unit 324A may configure a sampling packet including a first hash value and a first timestamp value. For example, prior to a change in the fabric path, source forwarding unit 324A may in some instances perform a hashing algorithm to select a destination forwarding unit, e.g., forwarding unit 324B, for a packet. Sampling module 376 of the source forwarding unit 324A may generate a sampling packet to include a first hash value associated with the initial destination forwarding unit 324B on the initial path and a first timestamp value. For example, source forwarding unit 324A may generate a sampling packet with routing information (e.g., packet header information) copied from a current data packet received by source forwarding unit 324A, such that the sampling packet may be sent on the same initial path as the current data packet. Source forwarding unit 324A may send the sampling packet on the initial path to forwarding unit 324B. Forwarding unit 324B receives the sampling packet and sampling module 376 of forwarding unit 324B may add a second hash value and a second timestamp value. Forwarding unit 324B may send the sampling packet with the hash values and timestamp values to path module 346 via programming interface 364.

Path module 346 may determine an actual packet reach time based on the first and second timestamps. For example, to determine the actual packet reach time for a packet flowing internally from source forwarding unit 324A to egress forwarding unit 324N, path module 346 may subtract the first timestamp value from the second timestamp value. Based on the actual packet reach time, path module 346 may, in some examples, add a tolerance value to the actual packet time to compute a buffering time period, which provides how long a packet is buffered. Although illustrated as included in routing component 318, path module 346 may be external to the network device, in some examples.

Path module 346 may send the second hash value to forwarding unit 324N, which in this instance identifies forwarding unit 324N as the egress forwarding unit for the new path. For example, packet processor 368 may include a hash lookup table 380 ("hash LU table 380") for storing the second hash value. In some examples, path module 346 may install hash lookup table 380 including the second hash value in forwarding path 372. In some examples, buffer module 347 may install hash lookup table 380 and path module 346 may install the second hash value in the hash lookup table 380.

The second hash value, at the egress forwarding unit 324N, uniquely identifies the packet flow that needs to be reordered. In some examples, the second hash value is installed by path module 346 in the hash lookup table 380 and the buffering decision is enabled only for flows including a hash that matches the second hash value in the hash lookup table 380. Path module 346 may also send the buffering time period to egress forwarding unit 324N via FU interface 316 such that egress forwarding unit 324N may buffer incoming packets in the packet flow forwarded on the new path in buffer 374 for the buffering time period, as described below.

In some examples, egress forwarding unit 324N may receive the subsequent packet prior to transmitting the initial packet to the network. In response to receiving the subsequent packet from source forwarding unit 324A, packet processor 368 may determine whether the subsequent packet is a packet forwarded on the initial path or the new path. For example, packet processor 368 may perform a lookup of hash lookup table 380 ("hash LU table 380") to determine if the subsequent packet matches a hash value (e.g., the second hash value) in hash LU table 380. Responsive to a successful lookup, which indicates the subsequent packet is forwarded on the new path, buffer module 347 may instruct forwarding unit 324N to store the subsequent packet in buffer 374 and start the timer associated with the packet flow.

As the subsequent packets are buffered, egress forwarding unit 324N may receive the initial packet from forwarding unit 324B over the switch fabric. Forwarding path 372 of egress forwarding unit 324N may determine that the packet did not come over an abstract fabric interface directly and may transmit the packet to IP/MPLS core network via an egress interface. Alternatively, egress forwarding unit 324N may receive the initial packet directly over the abstract fabric interface. In this example, egress forwarding unit 324N may perform a lookup of hash lookup table 380 and determine, based on a failed lookup of the second hash value in hash lookup table 380, that the initial packet was forwarded on the initial path. For example, packet processor 368 may determine that the hash value of the received packet does not match any stored value in hash lookup table 380. Packet processor 368 of forwarding unit 324N may then transmit the packet to IP/MPLS core network via an egress interface. For example, forwarding path 372 may perform a lookup of IFLs 371 to determine the logical interface that defines the corresponding forwarding path of paths 373 for the packet.

In response to the buffer time period for the packet flow having elapsed (i.e., timer expired), buffer module 347 may instruct forwarding unit 324N to release packets in the buffer 374 associated with the packet flow and disable any further buffering of packets in the packet flow by buffer 374. Packet processor 368 of forwarding unit 324N may then transmit the buffered packets to IP/MPLS core network via an egress interface. For example, forwarding path 372 may perform a lookup of IFLs 371 to determine the logical interface that defines the corresponding forwarding path of paths 373 for the packet.

In some examples, buffer module 347 may store and release packets in buffer 374 based on a sequence number order. For example, buffer module 347 may determine the sequence numbers of received packets and store the received packets based on each packet's sequence number. When the timer expires, the buffer module 347 may in one example release buffered packets in the order of the packets' sequence numbers and transmit the packets to the IP/MPLS core network in the order of the sequence number of the packets. In other examples, buffer module 347 may, upon the completion of the buffering time period, transmit the plurality of packets in the buffer to the IP/MPLS core network in the order that the plurality of packets was buffered.

Figure 4:
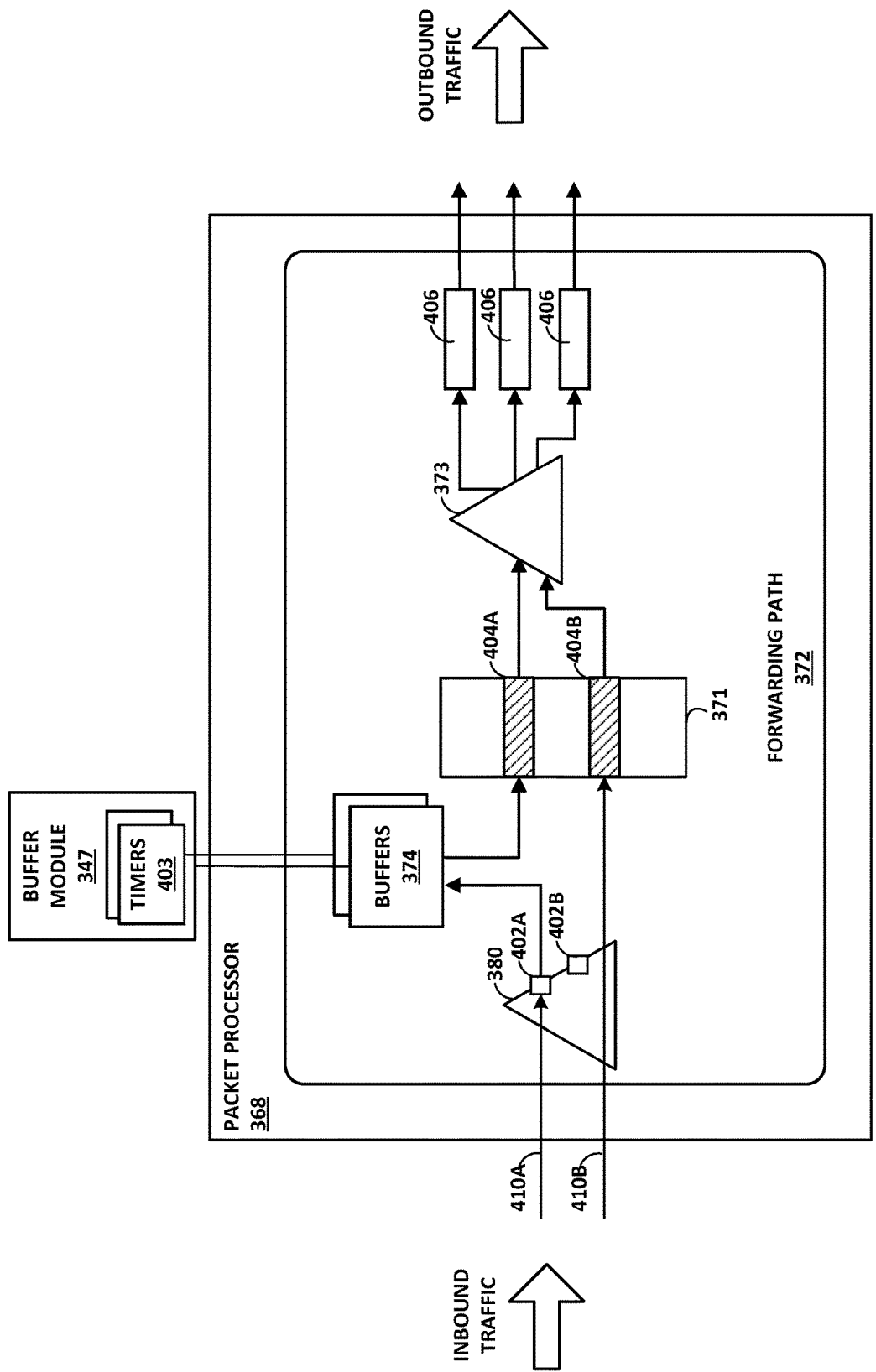
FIG. 4 is a block diagram illustrating, in further detail, an example forwarding path of a packet processor configured in accordance with techniques described in this disclosure.

FIG. 4 is a block diagram illustrating, in further detail, an example forwarding path 372 of a packet processor 368 of FIG. 3 configured in accordance with techniques described in this disclosure. In this example, packet processor 368 may receive packet 410A, 410B ("packets 410") via an ingress interface of packet processor 368. Assume for example packet 410A is forwarded on a new path from source forwarding unit 324A to egress forwarding unit 324N. Assume also that packets 410A, 410B may be associated with different packet flows, and therefore may have different 5-tuple values (source IP address, destination IP address, source port, destination port, and protocol).

In one example, packet processor 368 may receive packet 410A, determine a hash value for the packet 410A (e.g., based on the packet's 5-tuple and a random seed associated with the virtual node), and perform a lookup of hash lookup table 380 to determine if the hash value matches any stored hash value (e.g., second hash value received from path module) in hash lookup table 380. As described above, the second hash value is installed in hash lookup table 380 in forwarding path 372.

Responsive to determining that the hash value matches the hash value for stored hash entry 402A, the packet 410A is buffered in a selected one of buffers 374 for a buffering time period. Buffer module 347 may initiate a timer 403 associated with the packet flow for controlling how long packet 410A is buffered. In some examples, buffer module 347 may select the one of buffers 374 and the timer 403 for the packet flow, from among a plurality of buffers and timers each associated with different packet flows, based on the hash value. For example, a different packet flow (not shown) may be associated with a hash value that matches a different entry 402B in hash lookup table 380, which may be associated with a different one of buffers 374 and having a different timer 403 with a different associated time period for that packet flow. This provides buffering based on a "sliding window" of sampled packets and sets the delay for each flow.

Packet processor 368 may also receive packet 410B, determine a hash value for the packet 410B, and perform a lookup of the hash value in hash lookup table 380 to determine if a hash value of packet 410B matches the stored hash value in hash lookup table 380. Responsive to determining that the hash value of packet 410B does not match any stored value in hash lookup table 380 (a "failed" lookup), packet processor 368 allows the packet 410B to continue along the forwarding path 372 without buffering the packet, ultimately transmitting packet 410B to the IP/MPLS core network. For example, packet processor 368 may receive packet 410B over the abstract fabric interface. Packet 410B may have a different 5-tuple packet, therefore having a different hash value than the one stored in hash lookup table 380. Packet processor 368 determines that the hash value of packet 410B does not match any stored value in hash lookup table 380, and forwards packet 410B to the IP/MPLS core network.

Each of logical interfaces 404A, 404B ("logical inbound interfaces 404") from IFLs 371 may represent a logical layer 2 or layer 3 interface that defines the forwarding paths for the packets. Packet processor 368 may perform a lookup of IFLs 371 to determine the logical interface that defines the path in paths 373 for packet 410B and transmits packet 410B via egress interface 406 to IP/MPLS core network.

In response to the buffering time period having elapsed (i.e., timer expired), buffer module 347 instructs packet processor 368 to release any packets held in the buffer 374 and disables the buffer 374. In some examples, buffer module 347 may instruct packet processor 368 to release the packets in buffer 374 based on sequence number order of the buffered packets. In this example, buffer module 347 instructs packet processor 368 to mark the first packet in the buffer as the head of the flow. This ensures that for a particular flow, if there are any packets in-flight over the optimized/new path, these packets are forwarded to the egress interface 406 to IP/MPLS core network after the buffer is emptied for that particular flow.

Packet processor 368 then begins the process of transmitting packet 410A to the IP/MPLS core network. For example, each of logical interfaces 404A, 404B ("logical inbound interfaces 404") from IFLs 371 may represent a logical layer 2 or layer 3 interface that defines the forwarding paths for the packets. Packet processor 368 may perform a lookup of IFLs 371 to determine the logical interface that defines the path in paths 373 for packet 410A and transmits packet 410A via egress interface 406 to IP/MPLS core network.

Figure 5:
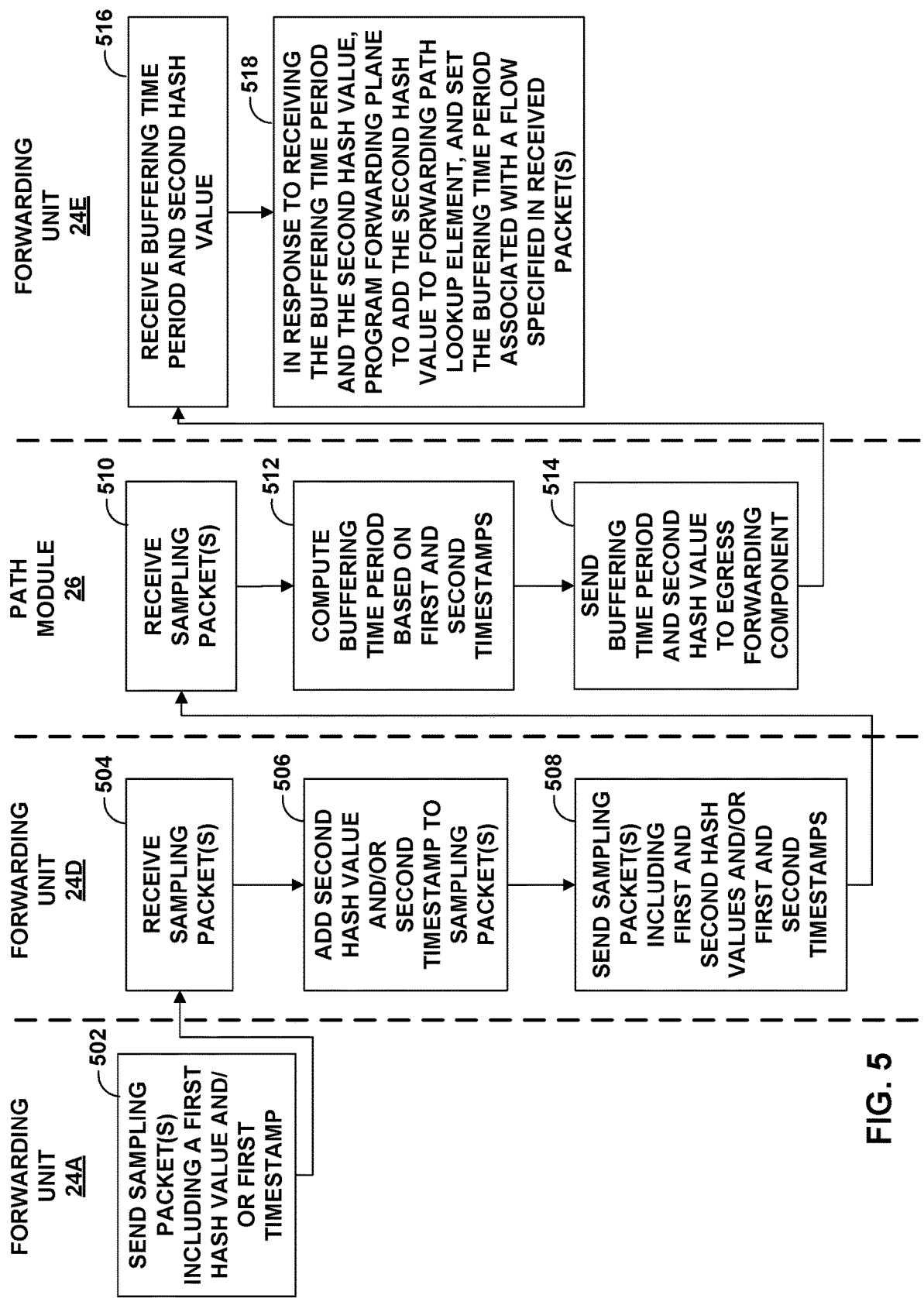
FIG. 5 is a flowchart illustrating example operation of network devices in accordance with one or more aspects of the disclosure.

FIG. 5 is a flowchart illustrating an example operation for generating sampling packets in accordance with one or more aspects of the disclosure. FIG. 5 will be described for purposes of example with respect to FIGS. 1-3.

Virtual routing nodes may generate one or more sampling packets including one or more hash values and/or one or more timestamps indicating the time at which the packet is at a virtual routing node. For example, source vPE 20 may send one or more sampling packets to the destination virtual routing node, e.g., vP 18A (502). The one or more sampling packets may include a first hash value associated with the first path for a given packet flow. The one or more sampling packets may additionally, or alternatively, include a first timestamp indicating the starting time of a packet flow flowing from source forwarding component (e.g., FC 24A) to an initial destination forwarding component (e.g., FC 24D).

Destination vP 18B may receive the sampling packet (504) and may add to the sampling packet, a second hash value associated with the second packet path for the same packet flow (506). Destination vP 18B may additionally, or alternatively, add a second timestamp to the one or more sampling packets. For example, the second timestamp may indicate the ending time of the packet flow flowing from source forwarding component (e.g., FC 24A) to the initial destination forwarding component (e.g., FC 24D). Destination vP 18B may send the one or more sampling packets including the first and second hash values and/or the first and second timestamps for the packet flow to path module 26 (508).

Path module 26 may receive the sampling packet including the first and second hash values and the first and second timestamps (510). In some examples, the first hash value identifies the initial, non-optimized path (e.g., to FC 24D) and is used by path module 26 to trigger a change in internal forwarding paths. For example, the first hash value may be required for ingress vPE 20 to determine which flow will undergo a change in its destination path.

In some examples, path module 26 may compute a buffering time period based on the first and second timestamps (512). For example, path module 26 may compute the difference between the first timestamp and the second timestamp. The difference in the first timestamp and the second timestamp represents the time it takes for a packet to travel from a source forwarding component to an initial destination forwarding component.

Path module 26 may send the buffering time period and the second hash value for the packet flow to an egress forwarding unit (e.g., FU 24E) (514). For example, path module 27 may send the buffering time period and the second hash value before the change in forwarding path is propagated to source vPE 20.

Egress forwarding unit 24E may receive from path module 26 information including the buffering time period and the second hash value (516). In response to receiving the buffering time period and the second hash value from path module 26, the egress forwarding unit 24E may program its forwarding plane to add the second hash value to the forwarding path lookup element (e.g., hash LU table 380 of FIG. 3), and may set the buffering time period associated with the flow specified in one or more received packets (518). In this way, egress forwarding unit 24E may determine whether one or more received packets for a packet flow are forwarded on an initial path (e.g., a first path) or a new path (e.g., a second path), and buffer the one or more packets forwarded on the new path for a buffering time period, as further described in FIG. 6 below.

Figure 6:
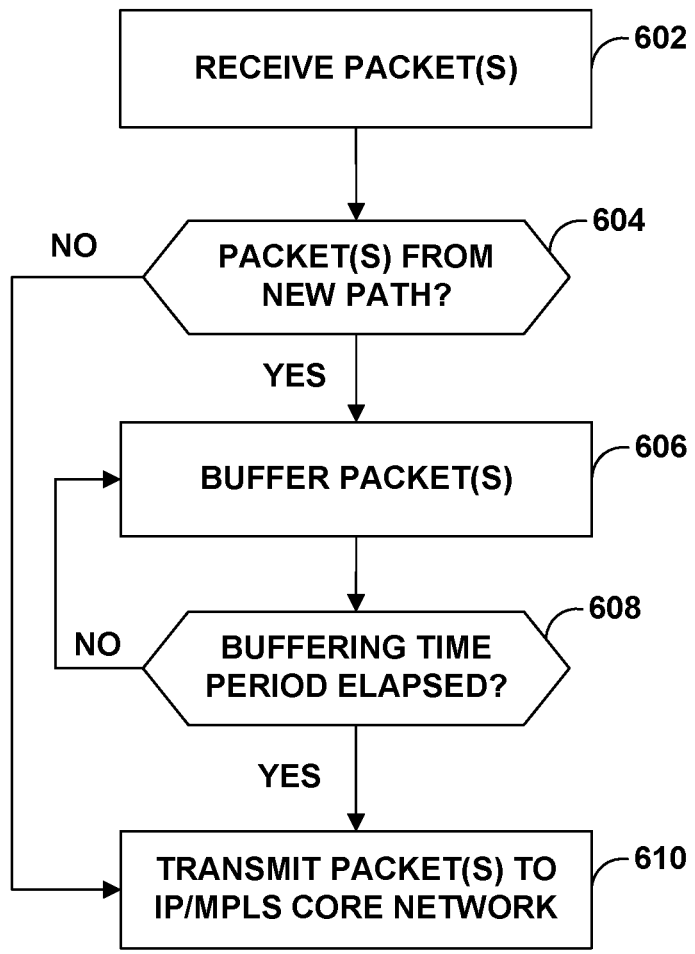
FIG. 6 is a flowchart illustrating example operation of network devices in accordance with one or more aspects of the disclosure.

FIG. 6 is a flowchart illustrating example operation of network devices in accordance with one or more aspects of the disclosure. FIG. 6 will be described for purposes of example with respect to FIGS. 1-3, such as from the perspective of vP 18B.

Destination vP 18B may receive one or more packets (602). For example, egress forwarding component 24E of destination vP 18B may receive the one or more packets from the switch fabric or directly over the abstract fabric interface. Destination vP 18B may determine whether the one or more packets were forwarded on a first path (e.g., an initial path) or a second path (e.g., a new path) (604). As described herein, for packets received directly over the abstract fabric interface, destination vP 18B may perform a lookup of a hash value, carried by at least one of the one or more packets, in hash lookup table 380 of the destination vP 18B, and determine, based on the lookup, that the one or more packets are (i) forwarded on the first path if the hash value has no corresponding entry in the hash lookup table 380, or (ii) forwarded on the second path if the hash value has a corresponding entry in the hash lookup table 380. In some examples, for packets received from the switch fabric, destination vP 18B may determine whether a packet is received from the first path by determining if the one or more packets have been received from the switch fabric but not directly over an abstract fabric interface. In some examples, a packet processor in the forwarding plane of destination vP 18B does the lookup on the ingress side of packet processing.

In response to a successful match ("YES" branch of 604), i.e., destination vP 18B determines that the one or more packets are forwarded on the second path, the destination vP 18B may buffer the one or more packets for a buffering time period (606). In some examples, destination vP 18B may buffer the one or more packets in order by a sequence number of each of the one or more packets.

In response to destination vP 18B determining the buffering time period has elapsed ("YES" branch of 608), destination vP 18B transmits the buffered one or more packets on an egress interface of the destination virtual routing node (610). For example, in response to determining that a timer has expired, buffer module 347 of a packet processor of destination vP 18B instructs packet processor 368 to release any packets held in the buffer and disables any further buffering. Destination vP 18B may then transmit the buffered one or more packets on an egress interface of destination vP 18B. For example, egress forwarding component 24E transmits the one or more packets on a Wide Area Network (WAN) interface. Alternatively, if destination vP 18B determines the buffering time period has not elapsed ("NO" branch of 608), destination vP 18B does not yet transmit the packets, but may continue buffering the one or more packets.

In response to a failed match ("NO" branch of 604), i.e., a lookup of a hash value carried in a header of the packet does not match the stored hash value, or the packet is received from the switch fabric but not directly over the abstract fabric interface, the destination vP 18B may transmit the one or more packets without buffering the one or more packets forwarded on the first packet path (610).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    receiving, by a destination virtual routing node of a network device having a plurality of packet processors and a switch fabric comprising a plurality of fabric links coupling respective pairs of the plurality of packet processors at respective fabric interfaces of the plurality of packet processors, one or more packets;
    determining, by the destination virtual routing node, whether the one or more packets are forwarded on a first path through the switch fabric or a second path through the switch fabric;
    obtaining, by the destination virtual routing node, a buffering time period computed from one or more timestamps included in a sampling packet, wherein the one or more timestamps are indicative of a time taken by the sampling packet to travel on the first path;
    in response to determining that the one or more packets are forwarded on the second path, buffering, by the destination virtual routing node, the one or more packets for the buffering time period; and
    in response to the buffering time period having elapsed, transmitting, by the destination virtual routing node, the buffered one or more packets on an egress interface of the destination virtual routing node.

2. The method of claim 1 further comprising:
    in response to determining that the one or more packets are forwarded on the first path, transmitting, by the destination virtual routing node, the one or more packets without buffering the one or more packets forwarded on the first path.

3. The method of claim 1, wherein transmitting the buffered one or more packets on the egress interface of the destination virtual routing node comprises transmitting the one or more packets on a Wide Area Network (WAN) interface.

4. The method of claim 1, wherein determining whether the one or more packets are forwarded on the first path or the second path comprises:
    performing a lookup of a hash value, carried by at least one of the one or more packets, in forwarding information of the destination virtual routing node; and
    determining, based on the lookup, that the one or more packets are (i) forwarded on the first path if the hash value has no corresponding entry in the forwarding information, or (ii) forwarded on the second path if the hash value has a corresponding entry in the forwarding information.

5. The method of claim 1, wherein determining whether the one or more packets are forwarded on the first path:
    determining if the one or more packets have been received from the switch fabric but not directly over an abstract fabric interface.

6. The method of claim 1, further comprising:
    sending, by a source virtual routing node of the network device and to the destination virtual routing node, the sampling packet, wherein the sampling packet includes a first hash value associated with the first path;
    receiving, by the destination virtual routing node, the sampling packet; and
    adding, by the destination virtual routing node and to the sampling packet, a second hash value associated with the second path in forwarding information of the destination virtual routing node,
    wherein determining whether the one or more packets are forwarded on the first path or the second path comprises determining if a third hash value generated from the one or more packets matches the second hash value stored in the forwarding information.

7. The method of claim 6,
    wherein sending the sampling packet further comprises sending the sampling packet including a first timestamp of the one or more timestamps indicating a time at which the sampling packet was sent by the source virtual routing node,
    wherein adding the second hash value further comprises adding a second timestamp of the one or more timestamps indicating a time at which the sampling packet was received by an initial destination virtual routing node, and
    wherein the buffering time period is determined based on the first timestamp and the second timestamp.

8. The method of claim 7, further comprising:
    sending, by the destination virtual routing node, the sampling packet to a buffer module for computing the buffering time period based on the first timestamp and the second timestamp;
    receiving, by the destination virtual routing node and from the buffer module, an indication of the computed buffering time period and at least the second hash value; and storing, by the destination virtual routing node, the second hash value in the forwarding information of the destination virtual routing node.

9. The method of claim 1,
wherein buffering the one or more packets comprises buffering the one or more packets in order by a sequence number of each of the one or more packets, and
wherein transmitting the buffered one or more packets comprises transmitting the buffered one or more packets on the egress interface in the order by the sequence number.

10. A network device comprising:
a plurality of packet processors;
a plurality of fabric links coupling respective pairs of the plurality of packet processors at respective fabric interfaces of a plurality of fabric components;
a virtual routing node of a plurality of virtual routing nodes, wherein the virtual routing node is configured to:
receive one or more packets;
determine whether the one or more packets are forwarded on a first path through a switch fabric or a second path through the switch fabric;
obtain a buffering time period computed from one or more timestamps included in a sampling packet, wherein the one or more timestamps are indicative of a time taken by the sampling packet to travel on the first path;
in response to determining that the one or more packets are forwarded on the second path, buffer the one or more packets for a buffering time period; and
in response to the buffering time period having elapsed, transmit the buffered one or more packets on an egress interface of a destination virtual routing node.

11. The network device of claim 10, wherein the virtual routing node is further configured to:
in response to determining that the one or more packets are forwarded on the first path, transmit the one or more packets without buffering the one or more packets forwarded on the first path.

12. The network device of claim 10, wherein, to transmit the buffered one or more packets on the egress interface of the destination virtual routing node, the virtual routing node is further configured to:
transmit the one or more packets on a Wide Area Network (WAN) interface.

13. The network device of claim 10, wherein, to determine whether the one or more packets are forwarded on the first path or the second path, the virtual routing node is further configured to:
perform a lookup of a hash value, carried by at least one of the one or more packets, in forwarding information of the destination virtual routing node; and
determine, based on the lookup, that the one or more packets are (i) forwarded on the first path if the hash value has no corresponding entry in the forwarding information, or (ii) forwarded on the second path if the hash value has a corresponding entry in the forwarding information.

14. The network device of claim 10, wherein, to determine whether the one or more packets are forwarded on the first path, the virtual routing node is further configured to:
determine if the one or more packets have been received from the switch fabric but not directly over an abstract fabric interface.

15. The network device of claim 10, wherein the virtual routing node comprises a first virtual routing node, and
wherein a second virtual routing node of the plurality of virtual routing nodes is configured to send, to the first virtual routing node, the sampling packet, wherein the sampling packet includes a first hash value associated with the first path,
wherein the first virtual routing node is further configured to:
receive the sampling packet, and
add a second hash value associated with the second path to the sampling packet,
wherein to determine whether the one or more packets are forwarded on the first path or the second path, the first virtual routing node further configured to determine if a third hash value generated from the one or more packets matches the second hash value stored in the forwarding information or if the one or more packets are ingressed from the switch fabric but not directly over an abstract fabric interface.

16. The network device of claim 15,
wherein, to send the sampling packet, the second virtual routing node is further configured to send the sampling packet including a first timestamp of the one or more timestamps indicating a time at which the sampling packet was sent by a source virtual routing node,
wherein, to add the second hash value, the first virtual routing node is further configured to add a second timestamp of the one or more timestamps indicating a time at which the sampling packet was received by the destination virtual routing node, and
wherein the buffering time period is determined based on the first timestamp and the second timestamp.

17. The network device of claim 16, wherein the first virtual routing node is further configured to:
send the sampling packet to a buffer module for computing the buffering time period based on the first timestamp and the second timestamp;
receive an indication of the computed buffering time period and at least the second hash value from the buffer module; and
store the second hash value in the forwarding information of the destination virtual routing node.

18. The network device of claim 10,
wherein, to buffer the one or more packets, the virtual routing node further configured to buffer the one or more packets in order by a sequence number of each of the one or more packets, and
wherein, to transmit the buffered one or more packets, the virtual routing node further configured to transmit the buffered one or more packets on the egress interface in the order by the sequence number.

19. A system comprising:
a plurality of packet processors;
a plurality of fabric links coupling respective pairs of the plurality of packet processors at respective fabric interfaces of a plurality of fabric components;
a path module configured to obtain a buffering time period computed from one or more timestamps included in a sampling packet, wherein the one or more timestamps are indicative of a time taken by the sampling packet to travel on a first path,
a source virtual routing node and a destination virtual routing node of a plurality of virtual routing nodes, wherein the destination virtual routing node is configured to:

receive one or more packets;

determine, based on the forwarding information, whether the one or more packets are forwarded on the first path through a switch fabric or a second path through the switch fabric;

in response determining that the one or more packets are forwarded on the second path, buffer the one or more packets for the buffering time period; and in response to the buffering time period having elapsed, transmit the buffered one or more packets on an egress interface of the destination virtual routing node.

20. The system of claim 19, wherein the plurality of packet processors, the plurality of fabric links, the source virtual routing node and the destination virtual routing node are in a network device, and wherein the path module is external to the network device.

21. The system of claim 19, wherein the source virtual routing node is configured to:

send, to the destination virtual routing node, the sampling packet including a first hash value associated with the first path and a first timestamp of the one or more timestamps indicating a time at which the sampling packet was sent by the source virtual routing node, the system further comprising an initial destination virtual routing node configured to:

receive the sampling packet;

add a second hash value associated with the second path to the sampling packet and a second timestamp indicating a time at which the sampling packet was received by the destination virtual routing node; and send the sampling packet to the path module for computing the buffering time period based on the first timestamp and the second timestamp, wherein the destination virtual routing node is further configured to:

receive an indication of the computed buffering time period and at least the second hash value from the path module;

store the second hash value in the forwarding information of the destination virtual routing node; and determine if a third hash value generated from the one or more packets matches the second hash value stored in the forwarding information or determine if the one or more packets are received from the switch fabric but not directly over an abstract fabric interface.

* * * * *